(12) United States Patent
Sivley, IV et al.

(10) Patent No.: US 7,475,917 B2
(45) Date of Patent: Jan. 13, 2009

(54) THREADED CONNECTION WITH VARIABLE FLANK ANGLES

(75) Inventors: Robert S. Sivley, IV, Kingwood, TX (US); Gary W. Ward, Conroe, TX (US); Doug R. Enderle, Humble, TX (US)

(73) Assignee: Hydril Company, Houston, TX (US)

( * ) Notice: Subject to any disclaimer, the term of this patent is extended or adjusted under 35 U.S.C. 154(b) by 117 days.

(21) Appl. No.: 11/393,300

(22) Filed: Mar. 30, 2006

(65) Prior Publication Data

US 2007/0228730 A1 Oct. 4, 2007

(51) Int. Cl.
*F16L 25/00* (2006.01)
(52) U.S. Cl. .................. 285/334; 285/333; 285/355; 285/390
(58) Field of Classification Search ......... 285/333–334, 285/355, 390
See application file for complete search history.

(56) References Cited

U.S. PATENT DOCUMENTS

| | | | |
|---|---|---|---|
| RE30,647 E | 6/1981 | Blose | |
| 4,703,954 A | 11/1987 | Ortloff | |
| RE34,467 E | 12/1993 | Reeves | |
| 5,338,074 A * | 8/1994 | Barringer et al. | 285/334 |
| 5,360,239 A | 11/1994 | Klementich | |
| 5,454,605 A | 10/1995 | Mott | |
| 6,206,436 B1 | 3/2001 | Mallis | |
| 6,578,880 B2 | 6/2003 | Watts | |
| 6,722,706 B2 | 4/2004 | Church | |
| 6,767,035 B2 | 7/2004 | Hashem | |
| 2003/0168858 A1 * | 9/2003 | Hashem | 285/334 |

* cited by examiner

*Primary Examiner*—Aaron M Dunwoody
*Assistant Examiner*—Fannie Kee
(74) *Attorney, Agent, or Firm*—Osha Liang LLP

(57) ABSTRACT

A threaded connection for a conduit includes a pin member and a box member. The pin member includes a pin thread having a pin thread crest, a pin thread root, a pin load flank oriented at a pin load flank angle, and a pin stab flank oriented at a pin stab flank angle. The box member includes a box thread having a box thread crest, a box thread root, a box load flank oriented at a box load flank angle, and a box stab flank oriented at a box stab flank angle. At least one of the pin load flank angle, the pin stab flank angle, the box load flank angle, and the box stab flank angle varies over at least part of the threaded connection.

8 Claims, 6 Drawing Sheets

THREADED CONNECTION WITH VARIABLE FLANK ANGLES

CROSS-REFERENCE TO RELATED APPLICATIONS

The present application is related to a co-pending U.S. patent application filed concurrently herewith titled "Mismatched Flanks for a Wedge Thread," having Ser. No. 11/393,452 and assigned to the assignee of the present application. That application is incorporated herein by reference in its entirety.

BACKGROUND OF INVENTION

Casing joints, liners, and other oilfield tubulars are often used in drilling, completing, and producing a well. Casing joints, for example, may be placed in a wellbore to stabilize a formation and protect a formation against high wellbore pressures (e.g., wellbore pressures that exceed a formation pressure) that could damage the formation. Casing joints are sections of steel pipe, which may be coupled in an end-to-end manner by threaded connections, welded connections, and other connections known in the art. The connections are usually designed so that a seal is formed between an interior of the coupled casing joints and an annular space formed between exterior walls of the casing joints and walls of the wellbore. The seal may be, for example, an elastomer seal (e.g., an o-ring seal), a thread seal, a metal-to-metal seal formed proximate the connection, or similar seals known in the art.

One type of threaded connection commonly used to form a thread seal in oilfield tubulars is a wedge thread. In FIGS. 1A and 1B, a prior art connection having a wedge thread is shown. "Wedge threads" are characterized by threads, regardless of a particular thread form, that increase in width in opposite directions on a pin member 101 and a box member 102. The rate at which the threads change in width along the connection is defined by a variable commonly known as a "wedge ratio." As used herein, "wedge ratio," although technically not a ratio, refers to the difference between the stab flank lead and the load flank lead, which causes the threads to vary in width along the connection. A detailed discussion of wedge ratios is provided in U.S. Pat. No. 6,206,436 issued to Mallis, and assigned to the assignee of the present invention. That patent is incorporated herein by reference in its entirety.

Wedge threads are extensively disclosed in U.S. Pat. No. RE 30,647 issued to Blose, U.S. Pat. No. RE 34,467 issued to Reeves, U.S. Pat. No. 4,703,954 issued to Ortloff, and U.S. Pat. No. 5,454,605 issued to Mott, all assigned to the assignee of the present invention and incorporated herein by reference. Continuing with FIGS. 1A and 1B, on the pin member 101, a pin thread crest 222 is narrow towards the distal end of the pin member 101 while a box thread crest 291 is wide. Moving along an axis 105 (from right to left), the pin thread crest 222 widens while the box thread crest 291 narrows. Referring still to FIGS. 1A and 1B, the threads are tapered, meaning that a pin thread 106 increases in diameter from beginning to end while a box thread 107 decreases in diameter in a complimentary manner. Having a thread taper can improve the ability to stab the pin member 101 into the box member 102 and distributes stress in the connection.

Generally, thread seals are difficult to achieve with nonwedge threads having broad crests and roots, however, the same thread forms may have thread seals when used for wedge threads. Wedge threads do not have any particular thread form. One example of a suitable thread form is a semi-dovetailed thread form disclosed in U.S. Pat. No. 5,360,239 issued to Klementich, and incorporated herein by reference. Another thread form includes a multi-faceted load flank or stab flank, as disclosed in U.S. Pat. No. 6,722,706 issued to Church, and incorporated herein by reference. Each of the above thread forms is considered to be a "trapped" thread form, meaning that at least a portion of the corresponding load flanks and/or corresponding stab flanks axially overlap. An open (i.e. not trapped) thread form with a generally rectangular shape is disclosed in U.S. Pat. No. 6,578,880 issued to Watts. The above thread forms are examples of thread forms that may be used for embodiments of the invention. Generally, open thread forms such as buttress or stub are not suitable for wedge threads because they would impart a large radial force on the box member. A generally square thread form, such as that disclosed by Watts, or a trapped thread form does not impart an outward radial force on the box member. Those having ordinary skill in the art will appreciate that the teachings contained herein are not limited to particular thread forms.

For wedge threads, a thread seal may be accomplished as a result of the contact pressure caused by interference over at least a portion of the connection between the pin load flank 226 and the box toad flank 225 and between the pin stab flank 232 and the box stab flank 231, which occurs when the connection is made-up. Close proximity or interference between the roots 292 and 221 and crests 222 and 291 completes the thread seal when it occurs over at least a portion of where the flank interference occurs. Generally, higher pressure may be contained wit increased interference between the roots and crests ("root/crest interference") on the pin member 101 and the box member 102 and by increasing flank interference. The particular connection shown in FIG. 1A also includes a metal-to-metal seal that is accomplished by contact pressure between corresponding seal surfaces 103 and 104, respectively located on the pin member 101 and box member 102.

Wedge threads typically do not have a positive stop torque shoulder on the connection. For wedge threads that do not have a positive stop torque shoulder, the make-up is "indeterminate," and, as a result, the relative position of the pin member and box member varies more during make-up for a given torque range to be applied than for connections having a positive stop torque shoulder. As used herein, "make-up" refers to threading a pin member and a box member together. "Selected make-up" refers to threading the pin member and the box member together with a desired amount of torque, or based on a relative position (axial or circumferential) of the pin member with the box member. For wedge threads that are designed to have both flank interference and root/crest interference at a selected make-up, both the flank interference and root/crest interference increase as the connection is made-up (i.e. increase in torque increases flank interference and root/crest interference). For tapered wedge threads that are designed to have root/crest clearance, the clearance decreases as the connection is made-up. Regardless of the design of the wedge thread, corresponding flanks come closer to each other (i.e. clearance decreases or interference increases) during make-up. Indeterminate make-up allows for the flank interference and root/crest interference to be increased by increasing the make-up torque on the connection. Thus, a wedge thread may be able to thread-seal higher pressures of gas and/or liquid by designing the connection to have more flank interference and/or root/crest interference or by increasing the make-up torque on the connection, however, this also increases stress on the connection during make-up, which could lead to failure during use.

Free-running threads used for oilfield tubular connections typically do not form thread seals when the connection is made-up. FIG. 2 shows a prior art connection having free-running threads. The free-running threads include load flanks 154 and 155, stab flanks 157 and 158, crests 159 and 162, and roots 160 and 161. As is typical of a connection with free-running threads, this connection relies on a positive stop torque shoulder formed by the contact of surfaces 151 and 152 disposed on the pin member 101 and the box member 102, respectively. The positive stop torque shoulder shown in FIG. 2 is commonly referred to as a "pin nose shoulder." In other connections, the positive stop torque shoulder may instead be formed by the box face 163 and a mating shoulder (not shown) on the pin member 101. The positive stop torque shoulder also provides a seal. Unlike wedge threads, which make-up by the wedging of the pin thread 106 and the box thread 107, free-running threads rely on the positive stop torque shoulder to load the connection during make-up. To make-up the connection shown in FIG. 2, the pin member 101 and the box member 102 are screwed together until the surfaces 151 and 152 are brought into abutment, at which point the pin load flank 154 and box load flank 155 are also in abutment. Additional torque is applied to the pin member 101 and the box member 102 to load the surfaces 151 and 152 and the pin load flank 154 and box load flank 155 until the desired amount of make-up torque has been applied to the connection.

The connection shown in FIG. 2 does not accomplish a thread seal because of the large gap 153 that exists between the pin stab flank 157 and box stab flank 158. The gap 153 occurs because of how free-running threads with positive stop torque shoulders are loaded. Applying torque to the connection during make-up against the positive stop torque shoulder causes the pin member 101 to be compressed while the box member 102 is stretched in tension. Note that when a box face shoulder is used, the box member 102 is compressed while the pin member 101 is stretched in tension. The force between the pin member 101 and the box member 102 is applied through the pin load flank 154 and box load flank 155. The pin stab flank 157 and the box stab flank 158 are not loaded during make-up. This results in contact pressure between the load flanks 154 and 155 and a gap between stab flanks 157 and 158. As discussed above, a wedge thread (as shown in FIGS. 1A and 1B) is able to form a thread seal in part because of the interference between the load flanks 225 and 226 and the stab flanks 232 and 231. For wedge threads, this occurs near the end of the make-up of the connection because of the varying width of the pin thread 106 and the box thread 107. To have similar interference between the load flanks 154 and 155 and stab flanks 157 and 158 on a cylindrical (i.e. non-tapered) free-running thread and the thread heights are continuous, the interference would exist substantially throughout the make-up of the connection because the pin thread 106 and the box thread 107 have a continuous width. Because the particular connection shown in FIG. 2 is cylindrical (i.e. not tapered), root/crest interference, if any, would exist substantially throughout the make-up of the connection. This could lead to galling of the threads and difficulty in making up the connection.

In the prior art, the angles at which the load flank and the stab flank are disposed relative to the central axis of the threaded connection are constant. As a result, a thread either has an open or trapped thread form for its entire length. Each thread form has advantages depending on its application. For example, a buttress thread form can be advantageous for a shouldered non-wedge connection that will experience a large amount of axial tension and relatively little axial compression. For wedge threads, a dovetailed thread form is often used because it pulls the pin member and the box member together during make-up. Also, an open thread form with positive flank angles can impart large radial forces as a result of the wedging force between the pin thread and the box thread.

In some connections, more than one thread form may be advantageous; however, one thread form must be selected over the other. The advantage of multiple thread forms in a connection was recognized in U.S. Pat. No. 6,767,035 issued to Hashem. The '035 patent discloses a shouldered connection having multiple threads formed on both the pin member and the box member. The cutting of multiple threads, sometimes referred to as a "multi-start" thread, results in a threaded connection that has an alternating open and closed thread form in a two-dimensional cross-section. Embodiments disclosed in the '035 patent have two threads formed on the pin member and the box member. One thread has an open thread form, such as a stub acme. The other thread has a trapped thread form, such as dovetailed or hooked. Such a combination of thread forms results in advantages of both thread forms existing uniformly over the length of the connection.

The stresses experienced by a threaded connection are not uniform over the length of a thread, for example, during bending of the distal ends and the middle portion of the threaded connection. As a result, a particular thread form can be the best for one part of the connection, but not for another. Thus, what is still needed is a threaded connection that allows for the thread form to be selected over different portions of the connection to distribute stresses.

SUMMARY OF INVENTION

In one aspect, the present invention relates to a threaded connection for a conduit. The threaded connection includes a pin member and a box member. The pin member includes a pin thread having a pin thread crest, a pin thread root, a pin load flank oriented at a pin load flank angle, and a pin stab flank oriented at a pin stab flank angle. The box member includes a box thread having a box thread crest, a box thread root, a box load flank oriented at a box load flank angle, and a box stab flank oriented at a box stab flank angle. At least one of the pin load flank angle, the pin stab flank angle, the box load flank angle, and the box stab flank angle varies over at least part of the threaded connection.

Other aspects and advantages of the invention will be apparent from the following description and the appended claims.

DETAILED DESCRIPTION

The present invention relates to threaded connections with a variable thread form. Specifically, the present invention relates to threads having at least one flank angle that varies on the threaded connection.

Typically, a thread is cut using an insert that has a surface matching at least one flank to be cut. The insert is passed multiple times across the pin member or box member being cut until the thread form is complete. This results in a constant thread form over the length of the thread. For wedge threads, the thread form may be referred to as a "wedge form" because the thread form varies in width according to the wedge ratio. "Wedge form," as used herein, refers to the thread form of a wedge thread. The wedge form is considered to be constant if only the width is varied. The present invention is not limited to either wedge threads or non-wedge threads, nor is the present invention limited to any particular thread form or wedge form.

Figure 1A:
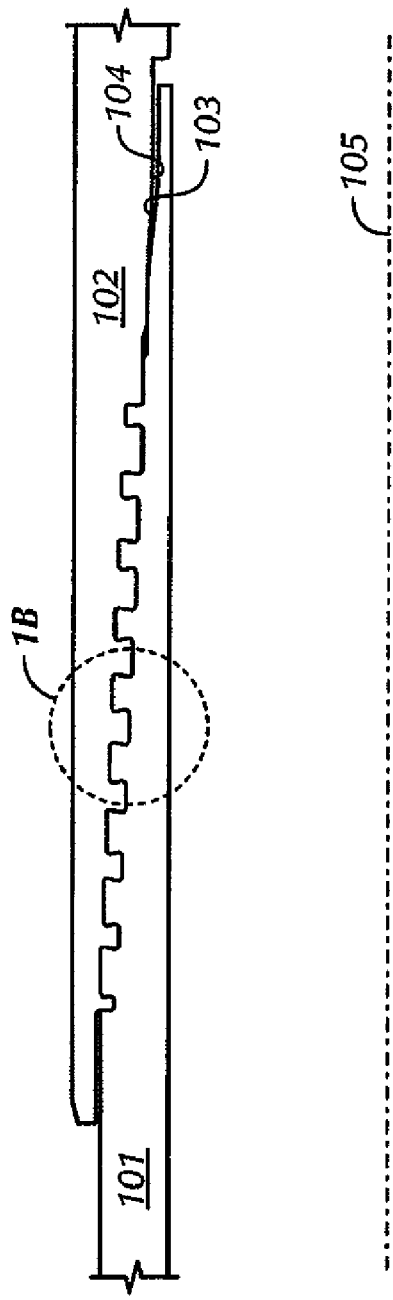
FIGS. 1A and 1B show a prior art wedge thread connection.
Figure 1B:
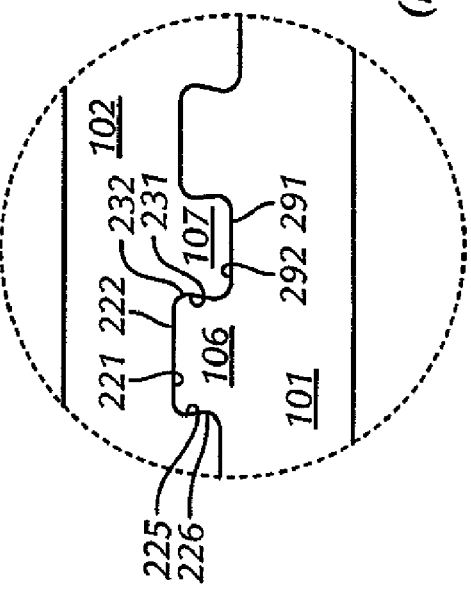
Figure 2:
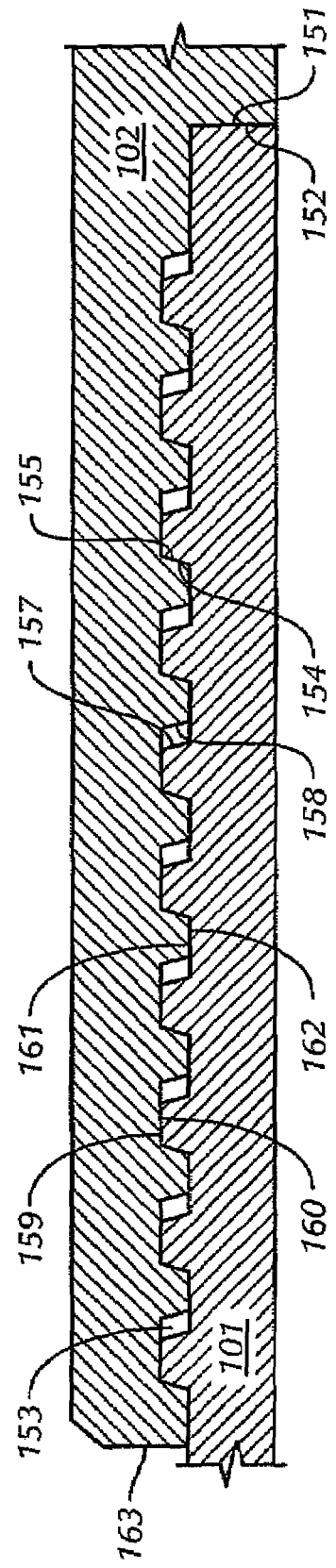
FIG. 2 shows a prior art non-wedge thread connection.
Figure 3A:
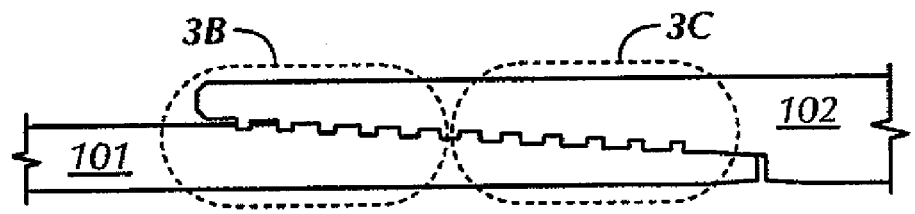
FIGS. 3A-C shows a threaded connection in accordance with an embodiment of the present invention.
Figure 3B:
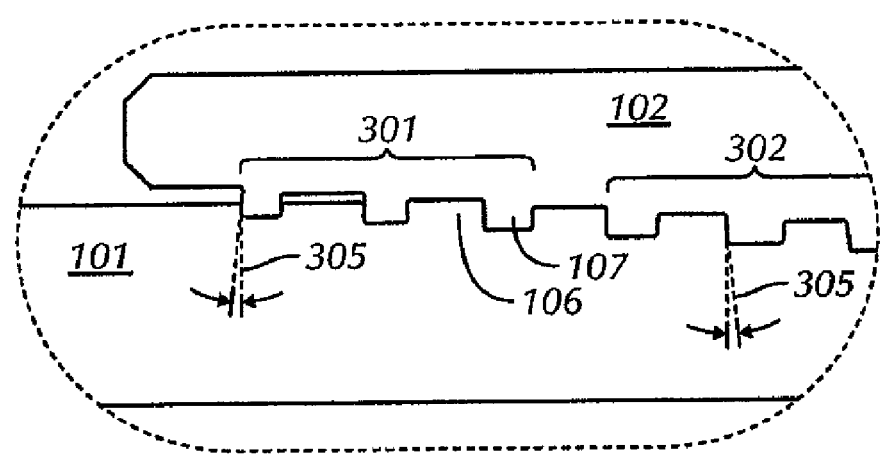
Figure 3C:
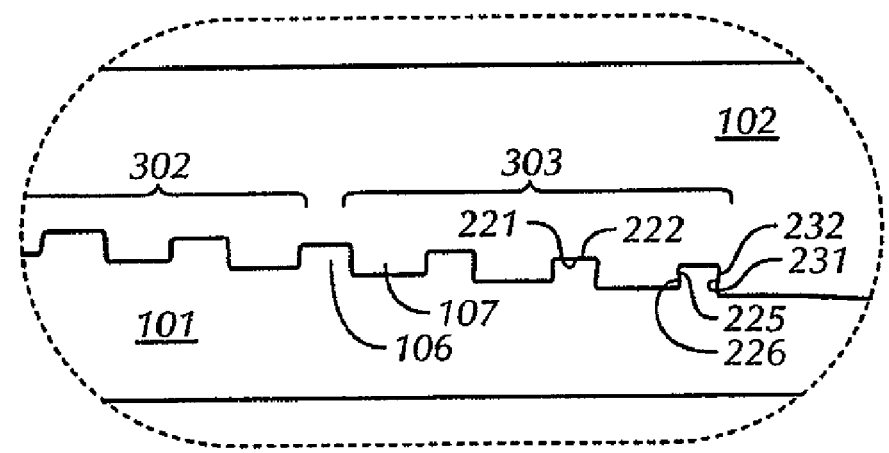

Embodiments of the present invention have threads with at least one variable flank angle. In FIGS. 3A-C, a threaded connection in accordance with an embodiment of the present invention is shown. In this particular embodiment, the pin member and the box member have wedge threads formed thereon. The wedge form varies between a trapped wedge form and an open wedge form. The trapped wedge form is a dovetail in this embodiment. The wedge form may be varied continuously along the thread. In the embodiment shown in FIGS. 3A-3C, the distal portions 301 and 303 have a dovetailed thread form, meaning that the pin stab flank 232, the box stab flank 231, the pin load flank 226, and the box load flank 225 are oriented at negative flank angles. As used herein, a negative flank angle means that the respective flank extends away from the center of the thread crest such that an axial overlap exists between the thread crest and the thread root. The flank angle may be quantified relative to a line 305 perpendicular to the central axis of the threaded connection. For example, a flank angle of zero degrees would be perpendicular to the central axis.

Continuing with FIGS. 3A-C, the flank angles for each flank vary over the length of the thread in this embodiment. Starting from the left end of the connection (distal end of the box member), each of the flanks has a negative flank angle of about −7 degrees. The flank angles increase by about 3 degrees per pitch until the middle of the thread, at which point the flank angles are about 5 degrees. After the midpoint, the flank angles decrease by about 3 degrees per pitch until the end of the thread (distal end of the pin member). Because of the change in flank angles, the dovetailed wedge form (trapped) gradually changes to a stub acme wedge form (open) and then back to a dovetailed wedge form (trapped). The dovetailed portions, 301 and 303, hold the pin member 101 and the box member 102 together radially. The stub acme portion 302 in the middle of the thread allows the connection to be more flexible, which can help bending strength of the connection. If all of the pin thread 106 and box thread 107 were an open wedge form, such as stub acme, large radial forces would tend to separate the pin member 101 and the box member 102 as a result of the wedging action; however, the stub acme portion 302 is prevented from doing so by the dovetailed portions 301 and 303. Those having ordinary skill in the art will appreciate that the present invention is not limited to any particular flank angles. Further, in some embodiments, the load flanks and the stab flanks may vary at different rates. In some embodiments, the corresponding flanks of the pin member 101 and the box member 102 may not vary at the same rate, or only flanks on one member may vary. Further, the variation of flank angles may not be constant. For example, a stab flank angle may be constant over a portion of the thread and then increase by about 3 degrees over about a pitch. Those having ordinary skill in the art will appreciate that the present invention is not limited by the rate of change of flank angles. In particular, any suitable change in flank angles may be used.

Figure 4A:
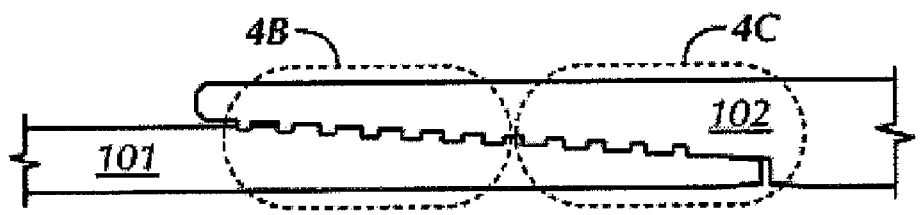
FIGS. 4A-C shows a threaded connection in accordance with an embodiment of the present invention.
Figure 4B:
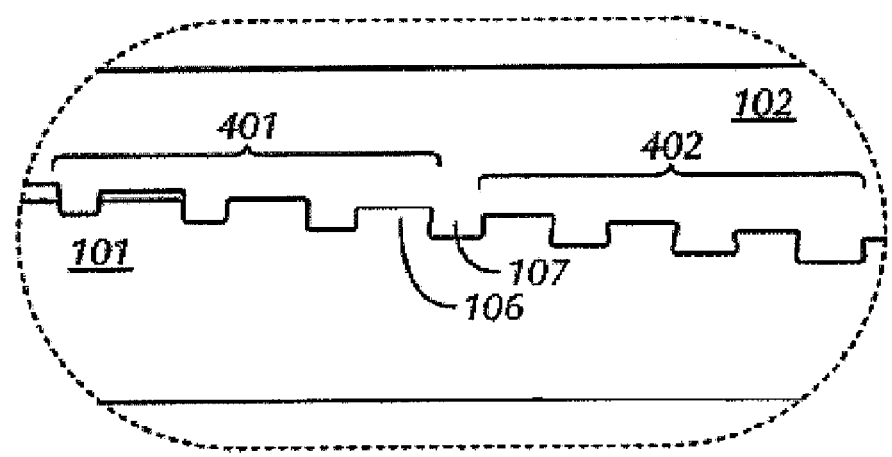
Figure 4C:
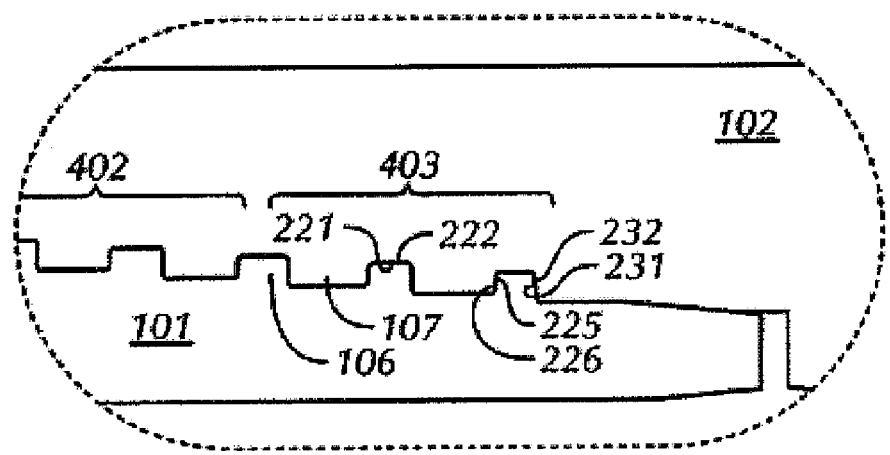

Turning to FIGS. 4A-C, a threaded connection in accordance with an embodiment of the present invention is shown. The embodiment shown in FIGS. 4A-C is the reverse of the embodiment shown in FIGS. 3A-C. Specifically, the pin thread 106 and the box thread 107 have an open wedge form in the distal portions 401 and 403 and a trapped wedge form in the middle portion 402. Because of this arrangement, the threaded connection is more flexible in the distal portions 401 and 403.

Figure 5A:
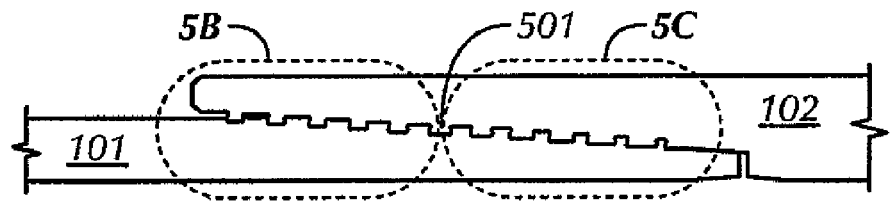
FIGS. 5A-C shows a threaded connection in accordance with an embodiment of the present invention.
Figure 5B:
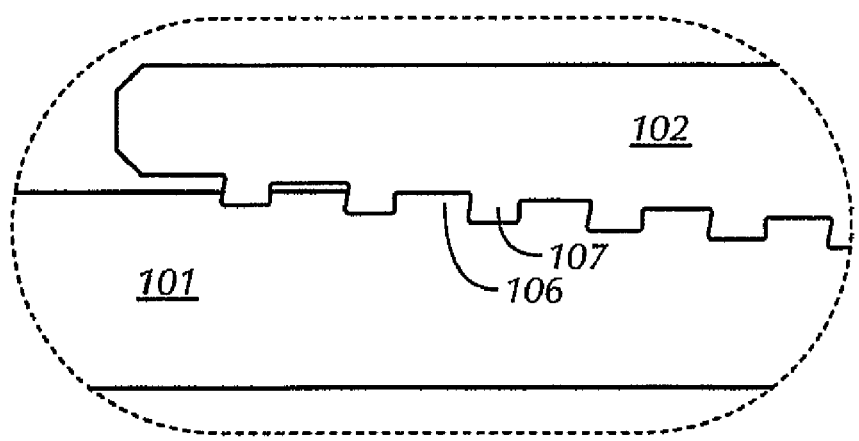
Figure 5C:
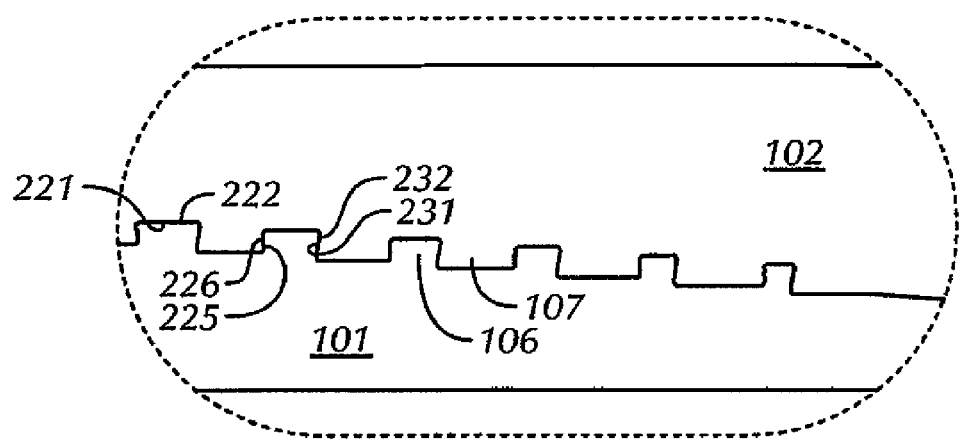

Some embodiments of the present invention may only vary either the stab flank angle or the load flank angle. An example of such an embodiment is shown in FIGS. 5A-C. In the threaded connection shown in FIGS. 5A-C, the angles of the pin load flank 226 and the box load flank 225 vary between about −4 degrees to about −7 degrees. The angles of the pin stab flank 232 and the box stab flank 231 are held substantially constant at about −7 degrees. From left to right, the load flank angles start at about −4 degrees and become more negative at a rate of about 0.5 degrees per pitch until the midpoint 501, at which point the load flank angles are about −7 degrees. At about the midpoint 501, the load flank angles begin to decrease at a rate of about 0.5 degrees per pitch, returning to about −4 degrees.

The embodiment shown in FIGS. 5A-C varies another feature of the threads. Specifically, the stab flank lead of both the pin thread 106 and the box thread 107 varies at about 0.0005 inches per pitch, while the load flank lead is substantially constant. As a result, the wedge ratio of the pin thread 106 and the box thread 107 also varies. From left to right, the pin stab flank lead and the box stab flank lead are about 0.2980 inches at the first pitch. Up to the midpoint 501, the pin stab flank lead and the box stab flank lead increase at about 0.0005 inches per pitch. After the midpoint 501, the pin stab flank lead and the box stab flank lead decrease at about 0.0005 inches per pitch.

Figure 6A:
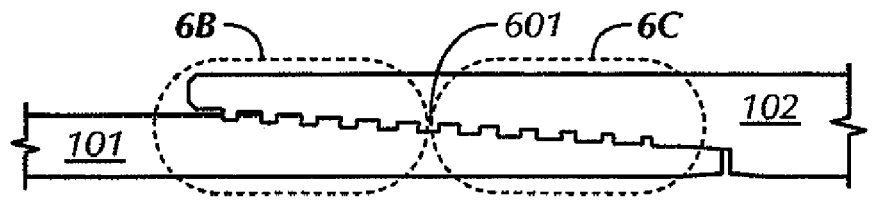
FIGS. 6A-C shows a threaded connection in accordance with an embodiment of the present invention.
Figure 6B:
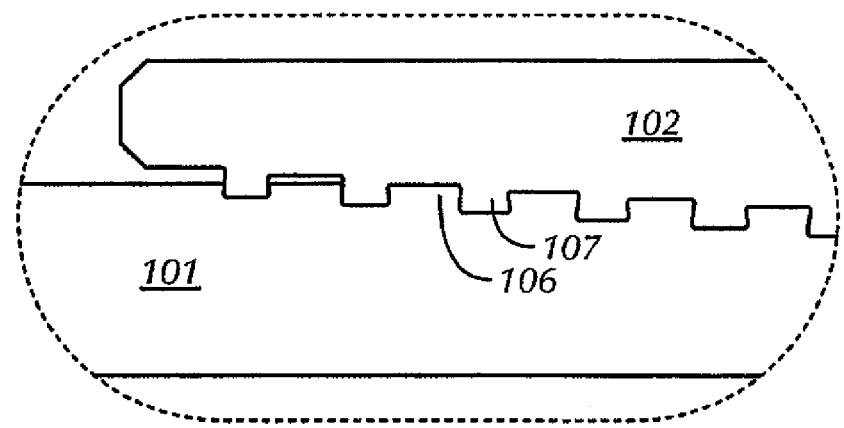
Figure 6C:
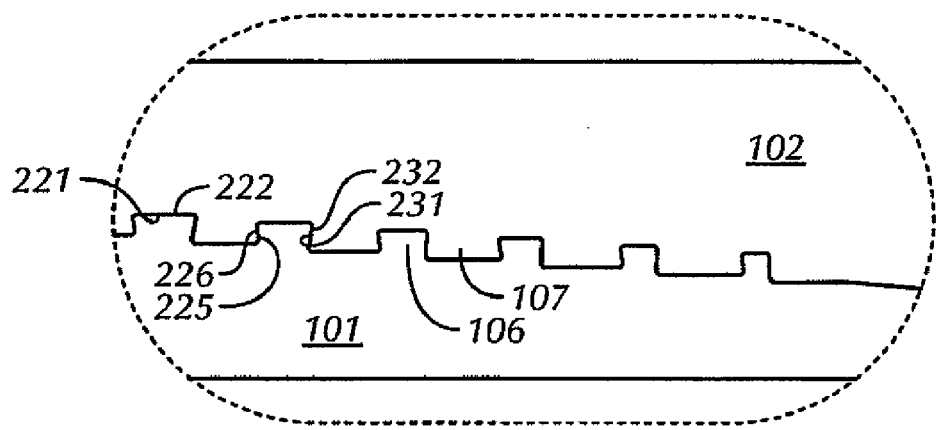

In FIGS. 6A-C, a threaded connection in accordance with an embodiment of the present invention is shown. In this particular embodiment, the angles of the pin stab flank 232 and the box stab flank 231 vary between about −4 degrees to about −7 degrees. The angles of the pin load flank 226 and the box load flank 225 are held substantially constant at about −7 degrees. From left to right, the stab flank angles start at about −4 degrees and become more negative at a rate of about 0.5 degrees per pitch until the midpoint 601, at which point the stab flank angles are about −7 degrees. At about the midpoint 601, the stab flank angles begin to decrease at a rate of about 0.5 degrees per pitch, returning to about −4 degrees. The stab flank lead of the embodiment shown in FIGS. 6A-C varies in the same manner as the embodiment shown in FIGS. 5A-C.

Several methods are available for manufacturing threaded connections in accordance with embodiments of the present invention. In one embodiment, the threads may be machined using a machine tool having an axis of rotation that is perpendicular to the axis of the threaded connection. A four-axis lathe may provide an axis of rotation perpendicular to the axis of the threaded connection. For example, a cutting insert may be rotated during the cutting of the thread to vary a flank angle along the thread. This method may be used on both the pin member and the box member. Preferably, the axis of rotation of the cutting insert is the center of the root radius. If the axis of rotation is at another location, the lathe may be programmed to compensate for the difference in the radial distance with respect to the axis of the threaded connection. Those having ordinary skill in the art will appreciate that embodiments of the present invention are not limited to particular manufacturing methods.

For embodiments having wedge threads, varying flank angles can help to provide a more determinate make-up. If the pin thread and the box thread have flank angles that vary in a corresponding manner, the threaded connection will tend to make-up with the flank angles closely aligned such that there is little or no difference in flank angles between corresponding flanks. As a result, the torque required to continue to make-up the connection will increase more sharply following flank alignment.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A threaded connection for a conduit, comprising:
   a pin member comprising a pin thread having a pin thread crest, a pin thread root, a pin load flank oriented at a pin load flank angle, and a pin stab flank oriented at a pin stab flank angle;
   a box member comprising a box thread having a box thread crest, a box thread root, a box load flank oriented at a box load flank angle, and a box stab flank oriented at a box stab flank angle;
   wherein at least one of the pin load flank angle, the pin stab flank angle, the box load flank angle, and the box stab flank angle varies at a substantially constant rate over at least part of the threaded connection;
   wherein the at least one of the pin load flank angle, the pin stab flank angle, the box load flank angle, and the box stab flank angle varies at the substantially constant rate between and including about 0.5 degrees per pitch and about 3 degrees per pitch.

2. The threaded connection of claim 1, wherein the pin thread and the box thread are wedge threads.

3. The threaded connection of claim 2, wherein a wedge form of the pin thread and the box thread is open on a selected portion and trapped on a selected portion.

4. The threaded connection of claim 3, wherein the wedge form is trapped on distal portions of the pin thread and the box thread and open in a central portion of the pin thread and the box thread.

5. The threaded connection of claim 3, wherein the wedge form is trapped on a central portion of the pin thread and the box thread and open in distal portions of the pin thread and the box thread.

6. The threaded connection of claim 2, wherein at least one of a load flank lead and a stab flank lead varies on at least one of the pin thread and the box thread.

7. The threaded connection of claim 1, wherein the at least one of the pin load flank angle, the pin stab flank angle, the box load flank angle, and the box stab flank angle increases at the substantially constant rate.

8. The threaded connection of claim 1, wherein the at least one of the pin load flank angle, the pin stab flank angle, the box load flank angle, and the box stab flank angle decreases at the substantially constant rate.

\* \* \* \* \*